United States Patent
Fukuta et al.

(10) Patent No.: US 10,283,809 B2
(45) Date of Patent: May 7, 2019

(54) LITHIUM-ION BATTERY SYSTEM

(71) Applicant: HITACHI CHEMICAL COMPANY, LTD., Tokyo (JP)

(72) Inventors: Ryuichiro Fukuta, Tokyo (JP); Katsunori Kojima, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 65 days.

(21) Appl. No.: 15/113,365

(22) PCT Filed: Jan. 20, 2015

(86) PCT No.: PCT/JP2015/051417
§ 371 (c)(1),
(2) Date: Jul. 21, 2016

(87) PCT Pub. No.: WO2015/111585
PCT Pub. Date: Jul. 30, 2015

(65) Prior Publication Data
US 2017/0012317 A1     Jan. 12, 2017

(30) Foreign Application Priority Data

Jan. 23, 2014  (JP) .................. 2014-010323

(51) Int. Cl.
| | | |
|---|---|---|
| *H01M 4/485* | (2010.01) | |
| *H01M 10/0525* | (2010.01) | |
| *H01M 4/505* | (2010.01) | |
| *H01M 4/525* | (2010.01) | |
| *H01M 10/0569* | (2010.01) | |
| *H01M 10/42* | (2006.01) | |
| *H01M 10/44* | (2006.01) | |

(52) U.S. Cl.
CPC ....... *H01M 10/0525* (2013.01); *H01M 4/485* (2013.01); *H01M 4/505* (2013.01); *H01M 4/525* (2013.01); *H01M 10/0569* (2013.01); *H01M 10/425* (2013.01); *H01M 10/44* (2013.01); *H01M 2010/4271* (2013.01); *H01M 2010/4292* (2013.01); *H01M 2300/0037* (2013.01); *Y02T 10/7011* (2013.01)

(58) Field of Classification Search
None
See application file for complete search history.

(56) References Cited

FOREIGN PATENT DOCUMENTS

| | | | |
|---|---|---|---|
| JP | 2001-210324 A | | 8/2001 |
| JP | 2001210324 A | * | 8/2001 |

(Continued)

OTHER PUBLICATIONS

International Search Report for PCT/JP2015/051417 dated Mar. 10, 2015; English Translated submitted herewith (5 Pages).

(Continued)

*Primary Examiner* — Tracy M Dove
(74) *Attorney, Agent, or Firm* — Fitch, Even, Tabin & Flannery, LLP (57) ABSTRACT

A lithium-ion battery system includes: a lithium-ion battery including a cathode and an anode, the cathode containing a lithium manganese-nickel complex oxide as a cathode active material, and the anode containing a lithium-titanium complex oxide as an anode active material; and a charge regulation means which regulates an end-of-charge voltage Vf within a range of $3.6 \text{ V} \leq Vf \leq 4.0 \text{ V}$.

9 Claims, 1 Drawing Sheet

(56) References Cited

FOREIGN PATENT DOCUMENTS

| | | | |
|---|---|---|---|
| JP | 4196234 | B2 | 12/2008 |
| JP | 2012-124026 | A | 6/2012 |
| JP | 2012-124114 | A | 6/2012 |
| JP | 2012124026 | A * | 6/2012 |
| JP | 2012-221799 | A | 11/2012 |
| JP | 2013-191529 | A | 9/2013 |
| JP | 2014-086303 | A | 5/2014 |
| WO | 2013/157854 | A1 | 10/2013 |

OTHER PUBLICATIONS

Written Opinion of the International Search Authority for PCT/JP2015/051417 dated Mar. 10, 2015.
Office Action of KR Application No. 10-2016-7020250 dated Dec. 20, 2017 with partial English translation.

* cited by examiner

LITHIUM-ION BATTERY SYSTEM

CROSS-REFERENCE TO RELATED APPLICATIONS

This application is a U.S. national phase application filed under 35 U.S.C. § 371 of International Application No. PCT/JP2015/051417, filed Jan. 20, 2015, designating the United States, which claims priority from Japanese Patent Application No. 2014-010323, filed Jan. 23, 2014, which are hereby incorporated herein by reference in their entirety.

TECHNICAL FIELD

The present invention relates to a lithium-ion battery system.

BACKGROUND ART

Lithium-ion batteries are secondary batteries having high energy density and are used as power sources for portable devices, such as a notebook computer or a cell phone, utilizing the characteristics thereof.

In recent years, as a power source for an electronic device, a power source for power storage, a power source for an electric car, etc., for which movement toward higher performance or downsizing is advancing, a lithium-ion battery offering high input-output property, high energy density, and long operating life has drawn attention.

For example, in Japanese Patent Publication (JP-B) No. 4196234, a battery using a cathode active material with a spinel structure having a lithium occlusion and release potential of from about 4.7 V to about 4.8 V with respect to Li/Li$^+$ in a cathode, and using, as an anode active material, titanium oxide with a spinel structure having a lithium occlusion and release potential of about 1.5 V with respect to Li/Li$^+$, has been studied from a viewpoint of achieving a high energy density and a longer operating life. In the battery, increase in an energy density of the battery has been achieved by using an active material which is capable of increasing a potential in a state of charge as a cathode active material. Meanwhile, since a potential of an anode in a state of charge is as high as about 1.5 V with respect to Li/Li$^+$, the activity of lithium occluded in a molecular structure in a state of charge is low, and the reduction of an electrolyte is suppressed. Further, even when a solvent, a supporting electrolyte salt, or the like which composes the electrolyte is a compound containing oxygen, since the anode active material is an oxide, an action to generate an oxide coating film at an interface of the electrolyte through a reaction between them can be reduced, and self-discharge of the battery is suppressed.

SUMMARY OF INVENTION

Technical Problem

JP-B No. 4196234 discloses that a battery achieving both a higher energy density and a longer operating life can be realized. However, according to diligent studies by the inventors of the present invention, it has been found that the technology disclosed in JP-B No. 4196234 is superior in terms of high energy density and long operating life, but inadequate in terms of input property. For example, in the case of a large-scale capacitor system, a lithium-ion battery is also required to have ability to cope with a rapid load fluctuation, and realization of a lithium-ion battery superior not only in high energy density and long operating life, but also in input property is demanded.

The invention was made under such circumstances, and aims to provide a lithium-ion battery system which is superior in input property and enables improvement in volumetric energy density.

Solution to Problem

The invention includes the following aspects.
<1> A lithium-ion battery system, comprising:
   a lithium-ion battery comprising a cathode and an anode, the cathode comprising a lithium manganese-nickel complex oxide as a cathode active material, and the anode comprising a lithium-titanium complex oxide as an anode active material; and
   a charge regulation means which regulates an end-of-charge voltage Vf within a range of 3.6 V≤Vf≤4.0 V.
<2> The lithium-ion battery system according to <1>, wherein a capacity ratio of the anode to the cathode (anode capacity/cathode capacity) is 0.7 or more and less than 1.

Advantageous Effects of Invention

According to the invention, a lithium-ion battery system which is superior in input property and enables improvement in volumetric energy density is provided.

DESCRIPTION OF EMBODIMENTS

A numerical range expressed herein by "x to y" includes the values of x and y in the range as the minimum and maximum values, respectively. Further, in referring herein to a content of a component in a composition, when plural kinds of substances exist corresponding to a component in the composition, the content means, unless otherwise specified, the total amount of the plural kinds of substances existing in the composition. Further, in referring herein to a particle size of a component in a composition, when plural kinds of particles exist corresponding to a component in the composition, the particle size means, unless otherwise specified, a value with respect to the mixture of the plural kinds of particles existing in the composition. Further, the term "layer" comprehends herein not only a structure formed over the whole surface when observed as a plan view, but also a structure formed only on a part of the same.

A lithium-ion battery system according to the invention includes: a lithium-ion battery including a cathode and an anode, the cathode containing a lithium manganese-nickel complex oxide as a cathode active material, and the anode containing a lithium-titanium complex oxide as an anode active material; and a charge regulation means which regulates an end-of-charge voltage Vf within a range of 3.6 V≤Vf≤4.0 V.

With respect to embodiments of the lithium-ion battery system according to the invention, a lithium manganese-nickel complex oxide which is a cathode active material, a lithium-titanium complex oxide which is an anode active material, and the overall constitution of the lithium-ion battery will be described below in this order.

<Lithium Manganese-nickel Complex Oxide>

A lithium manganese-nickel complex oxide which is a cathode active material for a lithium-ion battery according to the present embodiment, is preferably a lithium manganese-nickel complex oxide having a spinel structure (hereinafter also referred to as "spinel structured lithium manganese-nickel complex oxide"). A spinel structured lithium manganese-nickel complex oxide is expressed by $LiNi_xMn_{2-x}O_4$ (in which $0.3<X<0.7$), and is preferably $LiNi_{0.5}Mn_{1.5}O_4$ from a viewpoint of stability of a lithium-ion battery. In order to further stabilize the crystal structure of the spinel structured lithium manganese-nickel complex oxide, a spinel structured lithium manganese-nickel complex oxide whose Mn—Ni site is partly substituted with another metal element may be used as a cathode active material.

A spinel structured lithium manganese-nickel complex oxide in which excessive lithium is made present in a crystal, or a spinel structured lithium manganese-nickel complex oxide in which a defect is generated in an O site may be also used. Examples of other metal elements with which a Mn/Ni site may be substituted include Ti, V, Cr, Fe, Co, Zn, Cu, W, Mg, Al, and Ru. These metal elements may be used singly, or in a combination of two or more kinds thereof. Among the substitutable metal elements, Ti is preferable from a viewpoint of stabilization of a crystal structure.

From a viewpoint of improvement of volumetric energy density, the lithium manganese-nickel complex oxide has preferably an electric potential in a state of charge of from 4.5 V and 5.0 V, and more preferably from 4.6 V to 4.9 V, with respect to $Li/Li^+$.

In an embodiment, a cathode in a lithium-ion battery system may additionally contain a cathode active material other than a lithium manganese-nickel complex oxide.

Examples of a cathode active material other than a lithium manganese-nickel complex oxide include $Li_xCoO_2$, $Li_{x^-}NiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (in the respective formulas, M represents at least one element selected from the group consisting of Na, Mg, Sc, Y, Mn, Fe, Co, Cu, Zn, Al, Cr, Pb, Sb, V, and B; x=0 to 1.2, y=0 to 0.9, and z=2.0 to 2.3). In this regard, the x value expressing a molar ratio of lithium fluctuates owing to charge and discharge.

The lithium manganese-nickel complex oxide is preferably a particle. From a viewpoint of improvement of battery characteristics, the average particle diameter of the particle is preferably from 1 μm to 50 μm, more preferably from 5 μm to 40 μm, and further preferably from 10 μm to 30 μm. Examples of the shape of the particle include aggregate, polyhedral, spherical, ellipsoidal, platy, acicular, and columnar. Among these, it is preferable that primary particles aggregate to form a secondary particle in a spherical or ellipsoidal shape.

The average particle diameter may be determined, for example, as an arithmetic mean value of values of the major axis lengths (maximum particle diameters) of all active material particles (lithium manganese-nickel complex oxide) in a randomly-selected portion of 100 μm in length and 100 μm in width of an electrode (cathode), taken using a scanning electron micrograph.

The content of the lithium manganese-nickel complex oxide is preferably from 60% by mass to 100% by mass, more preferably from 70% by mass to 100% by mass, and further preferably from 85% by mass to 100% by mass, with respect to the total amount of a cathode active material from a viewpoint of improvement of battery capacity.

<Lithium-titanium Complex Oxide>

A lithium-titanium complex oxide to be used as an anode active material for a lithium-ion battery is preferably a lithium-titanium complex oxide having a spinel structure (hereinafter also referred to as "spinel structured lithium-titanium complex oxide"). A basic compositional formula for a spinel structure lithium-titanium complex oxide is expressed as $Li[Li_{1/3}Ti_{5/3}]O_4$. For further stabilizing the crystal structure, a spinel structured lithium-titanium complex oxide in which Li or Ti site is partly substituted with another metal element, a spinel structured lithium-titanium complex oxide in which excessive lithium is present in the crystal, or a spinel structured lithium-titanium complex oxide in which O site is partly substituted with another element, may be used. Examples of another metal element suitable for substitution include F, B, Nb, V, Mn, Ni, Cu, Co, Zn, Sn, Pb, Al, Mo, Ba, Sr, Ta, Mg, and Ca. These may be used singly, or in a combination of two or more kinds thereof.

The electric potential of the lithium-titanium complex oxide in a state of charge is preferably from 1 V to 2 V with respect to $Li/Li^+$.

In an embodiment, an anode in a lithium-ion battery system may additionally contain an anode active material other than a lithium-titanium complex oxide.

Examples of an anode active material other than a lithium-titanium complex oxide include a carbon material.

The lithium-titanium complex oxide is preferably a particle. The average particle diameter of the particle is preferably from 0.05 μm to 30 μm, more preferably from 0.1 μm to 20 μm, and further preferably from 0.2 μm to 10 μm, from a viewpoint of improvement of battery characteristics. Examples of the shape of the particle include aggregate, polyhedral, spherical, ellipsoidal, platy, acicular, and columnar. Among these, it is preferable that primary particles aggregate to form a secondary particle in a spherical or ellipsoidal shape.

The average particle diameter may be determined, for example, as an arithmetic mean value of values of the major axis lengths (maximum particle diameters) of all active material particles (lithium-titanium complex oxide) in a randomly-selected portion of 10 μm in length and 10 μm in width of an electrode (anode), taken using a scanning electron micrograph.

The content of the lithium-titanium complex oxide is preferably from 70% by mass to 100% by mass, more preferably from 80% by mass to 100% by mass, and further preferably from 90% by mass to 100% by mass, with respect to the total amount of an anode active material from viewpoints of improvement of safety and cycle performance of a lithium-ion battery.

<Overall Constitution of Lithium-ion Battery>

A cathode of a lithium-ion battery employs, for example, the lithium manganese-nickel complex oxide as a cathode active material, and an electroconductive material and a binder are added to the lithium manganese-nickel complex oxide, and if necessary also an appropriate solvent is added, to form a paste (cathode mixture slurry), which is then coated on a surface (single side or both sides) of a current collector made of a metallic foil such as an aluminum foil, followed by drying, thereby forming a layer of a cathode mixture (solid content including at least the cathode active material, the electroconductive material, and the binder, except the solvent) (hereinafter also referred to as "cathode mixture layer"). Thereafter, it is preferable to conduct pressing or the like to increase the density of the cathode mixture layer, if necessary. Although a cathode active material may be composed solely of the lithium manganese-nickel complex oxide, a known lithium complex oxide such as $LiCoO_2$, $LiNiO_2$, $LiMn_2O_4$, $LiFePO_4$, or $Li(Co_{1/3}Ni_{1/3}Mn_{1/3})O_2$ may be added to the lithium manganese-nickel complex oxide to form a cathode active material for purpose of improvement of lithium-ion battery characteristics, or the like.

The coating amount of the cathode mixture is preferably from 100 $g/m^2$ to 200 $g/m^2$, more preferably from 120 $g/m^2$ to 180 $g/m^2$, and further preferably from 130 $g/m^2$ to 170 $g/m^2$, per one surface of a current collector from a viewpoint of further improvement of input property and volumetric energy density.

The density of the cathode mixture layer is preferably from 2.0 $g/cm^3$ to 3.2 $g/cm^3$, more preferably from 2.1 $g/cm^3$ to 3.0 $g/cm^3$, and further preferably from 2.2 $g/cm^3$ to 2.8 $g/cm^3$, from a viewpoint of further improvement of input property and volumetric energy density.

An anode may employs the lithium-titanium complex oxide as an anode active material, and an electroconductive material and a binder are added to the lithium-titanium complex oxide, and if necessary also an appropriate solvent is added, to form a paste (anode mixture slurry), which is then coated on a surface (single side or both sides) of a current collector made of a metallic foil such as a copper foil, followed by drying, thereby forming a layer of an anode mixture (solid content including at least the anode active material, the electroconductive material, and the binder, except the solvent) (hereinafter also referred to as "anode mixture layer"). Thereafter, it is preferable to conduct pressing or the like to increase the density of the anode mixture if necessary. Although an anode active material may be composed solely of the lithium-titanium complex oxide, a known carbon material or the like may be added to the lithium-titanium complex oxide to form an anode active material for purpose of improvement of lithium-ion battery characteristics, or the like.

The coating amount of the anode mixture is preferably from 40 $g/m^2$ to 170 $g/m^2$, more preferably from 50 $g/m^2$ to 150 $g/m^2$, and further preferably from 60 $g/m^2$ to 130 $g/m^2$, per one surface of a current collector from a viewpoint of further improvement of input property and volumetric energy density.

The density of the anode mixture layer is preferably from 1.3 $g/cm^3$ to 2.4 $g/cm^3$, more preferably from 1.4 $g/cm^3$ to 2.2 $g/cm^3$, and further preferably from 1.5 $g/cm^3$ to 2.0 $g/cm^3$, from a viewpoint of further improvement of input property and volumetric energy density.

Since the electrical resistances of a cathode active material and an anode active material are high, the electroconductive material is used for securing electrical conductivity of a cathode and an anode. As the electroconductive material, one of powders of carbonaceous materials such as carbon black, such as acetylene black or Ketjenblack, or graphite, may be used singly, or a mixture of two or more thereof may be used. Further, a small amount of carbon nanotube, graphene, or the like. as an electroconductive material, may be added whereby the electrical conductivity of a cathode and/or an anode may be improved. The kinds of an electroconductive material to be added in a cathode and an anode may be the same as or different from one another.

As for the content of an electroconductive material, a range of the content of an electroconductive material with respect to the mass of a cathode mixture is as follows. The lower limit of the content of an electroconductive material is preferably 0.01% by mass or more, more preferably 0.1% by mass or more, and further preferably 1% by mass or more, from a viewpoint of superior electrical conductivity of a cathode. The upper limit thereof is preferably 50% by mass or less, more preferably 30% by mass or less, and further preferably 15% by mass or less, from a viewpoint of improvement of battery capacity.

A range of the content of an electroconductive material with respect to the mass of an anode mixture is as follows. The lower limit of the content of an electroconductive material is preferably 0.01% by mass or more, more preferably 0.1% by mass or more, and further preferably 1% by mass or more, from a viewpoint of superior electrical conductivity of an anode. The upper limit thereof is preferably 45% by mass or less, more preferably 30% by mass or less, and further preferably 15% by mass or less, from a viewpoint of improvement of battery capacity.

The binder is not particularly limited, and a material having favorable solubility, dispersibility, or the like in a dispersion medium is selected. Specific examples thereof include a resinous polymer such as polyethylene, polypropylene, poly(ethylene terephthalate), poly(methyl methacrylate), polyimide, aromatic polyamide, cellulose, or nitrocellulose; a rubbery polymer such as SBR (styrene-butadiene rubber), NBR (acrylonitrile-butadiene rubber), fluoro rubber, isoprene rubber, butadiene rubber, or ethylene-propylene rubber; a thermoplastic elastomer polymer such as a styrene-butadiene-styrene block copolymer or a hydrogenated product thereof, EPDM (ethylene-propylene-diene terpolymer), a styrene-ethylene-butadiene-ethylene copolymer, or a styrene-isoprene-styrene block copolymer or a hydrogenated product thereof; a soft resin polymer such as syndiotactic 1,2-polybutadiene, poly(vinyl acetate), an ethylene-vinyl acetate copolymer, or a propylene-α-olefin copolymer; a fluorine-containing polymer such as poly(vinylidene fluoride) (PVdF), polytetrafluoroethylene, fluorinated poly(vinylidene fluoride), a polytetrafluoroethylene-ethylene copolymer, or a polytetrafluoroethylene-vinylidene fluoride copolymer; a copolymer in which acrylic acid and a linear ether group are added to a polyacrylonitrile skeleton; and a polymer composition having ion conductance of an alkali metal ion (especially lithium-ion). These may be used singly, or in a combination of two or more kinds thereof. As a binder, for both a cathode and an anode, use of poly(vinylidene fluoride) (PVdF), or a copolymer in which acrylic acid and a linear ether group are added to a polyacrylonitrile skeleton polyacrylonitrile skeleton is preferable from a viewpoint of high adherence to a current collector.

As for the content of the binder, a range of the content of a binder with respect to the mass of a cathode mixture is as follows. The lower limit of the content of a binder is preferably 0.1% by mass or more, more preferably 1% by mass or more, and further preferably 3% by mass or more, from a viewpoint that a cathode active material is satisfactory bonded and satisfactory mechanical strength of a cathode is obtained, and that a battery performance such as cycle performance is stabilized. The upper limit is preferably 30% by mass or less, more preferably 20% by mass or less, and further preferably 10% by mass or less, from a viewpoint of improvement of battery capacity, electrical conductivity, or the like.

A range of the content of a binder with respect to the mass of an anode mixture is as follows. The lower limit of the content of a binder is preferably 0.1% by mass or more, more preferably 0.5% by mass or more, and further preferably 1% by mass or more, from a viewpoint that an anode active material is satisfactory bonded and satisfactory mechanical strength of an anode is obtained, and that a battery performance such as cycle performance is stabilized.

The upper limit thereof is preferably 40% by mass or less, more preferably 25% by mass or less, and further preferably 15% by mass or less, from a viewpoint of improvement of battery capacity, electrical conductivity, or the like.

As a solvent for dispersing the active material, the electroconductive material, the binder, or the like, an organic solvent such as N-methyl-2-pyrrolidone may be used.

A lithium-ion battery system according to an embodiment has constituent elements such as a cathode and an anode, as well as a separator to be interposed between the cathode and the anode, a non-aqueous electrolytic solution, and the like, similarly to general lithium-ion batteries.

There is no particular restriction on a separator, as long as it is capable of electronically isolating a cathode and an anode, while having a ion permeability, and resistance to oxidation on the cathode side and reduction on the anode side. As a material for a separator satisfying such properties, a resin, an inorganic substance, glass fiber, or the like may be used.

Examples of the resin to be used include an olefinic polymer, a fluorine-containing polymer, a cellulosic polymer, polyimide, and nylon. Specifically, it is preferably selected from materials which are stable with respect to a non-aqueous electrolytic solution and are superior in liquid retention, and use of a porous sheet or a nonwoven fabric made from a polyolefin such as polyethylene or polypropylene, as a source material is preferable. Considering that the average electric potential of a cathode is as high as from 4.7 V to 4.8 V with respect to $Li/Li^+$, a separator having a three-layered structure of polypropylene/polyethylene/polypropylene, in which polyethylene is interposed between polypropylene having resistance to a high electric potential, is also preferable.

Examples of the inorganic substance to be used include oxides such as alumina or silicon dioxide; nitrides such as aluminum nitride or silicon nitride; and sulfates such as barium sulfate or calcium sulfate. For example, the inorganic substance in a fibrous or particulate shape adhered to a substrate in a thin film shape, such as a nonwoven fabric, a woven cloth, or a microporous film, may be used as a separator. A substrate in a thin film shape having a pore size of from 0.01 μm to 1 μm, and a thickness of from 5 μm to 50 μm is used favorably. For example, the inorganic substance in a fibrous or particulate shape may be formed into a complex porous layer using a binder such as a resin, and used as a separator. Further, the complex porous layer may be formed on a surface of a cathode or an anode, and used as a separator. For example, a complex porous layer prepared by binding an alumina particle having a 90%-cumulative particle size of less than 1 μm with a fluorine-containing resin as a binder may be formed on a surface of a cathode, or on a surface of a separator facing a cathode.

Further, for the cathode active material and the anode active material, a cathode current collector and an anode current collector are used, respectively. As a material for a cathode current collector, aluminum, titanium, stainless steel, nickel, baked carbon, an electroconductive polymer, electroconductive glass, and the like may be used, as well as aluminum, copper, or the like which surface is treated with carbon, nickel, titanium, silver, or the like for a purpose of improvement of adhesiveness, electrical conductivity, oxidation resistance, or the like. As a material for an anode current collector, copper, stainless steel, nickel, aluminum, titanium, baked carbon, an electroconductive polymer, electroconductive glass, an aluminum-cadmium alloy, or the like may be used, as well as, copper, aluminum, or the like which surface is treated with carbon, nickel, titanium, silver, or the like for a purpose of improvement of adhesiveness, electrical conductivity, reduction resistance, or the like. In this regard, the respective thickness of a cathode current collector and an anode current collector is preferably from 1 μm to 50 μm from viewpoints of electrode strength and volumetric energy density.

In an embodiment, an electrolytic solution is composed of a lithium salt (electrolyte) and a non-aqueous solvent dissolving the same. If necessary, an additive material may be added.

Examples of a lithium salt include $LiPF_6$, $LiBF_4$, LiFSI (lithium bis(fluorosulfonyl)imide), LiTFSI (lithium bis(trifluoromethanesulfonyl)imide), $LiClO_4$, $LiB(C_6H_5)_4$, $LiCH_3SO_3$, $LiCF_3SO_3$, $LiN(SO_2F)_2$, $LiN(SO_2CF_3)_2$, and $LiN(SO_2CF_2CF_3)_2$. The lithium salts may be used singly, or in a combination of two or more kinds thereof. Among them, lithium hexafluorophosphate ($LiPF_6$) is preferable from an overall assessment of solubility in a solvent, charge and discharge characteristics of a secondary battery to be assembled, output characteristics, cycle performance, or the like The concentration of the lithium salt with respect to a non-aqueous solvent is preferably from 0.5 mol/L to 1.5 mol/L, more preferably from 0.7 mol/L to 1.3 mol/L, and further preferably from 0.8 mol/L to 1.2 mol/L. When the concentration of a lithium salt is from 0.5 mol/L to 1.5 mol/L, the charge and discharge characteristics can be further improved.

There is no particular restriction on a non-aqueous solvent, as long as it is a non-aqueous solvent usable as a solvent for an electrolyte for a lithium-ion battery. Examples thereof include a cyclic carbonate such as ethylene carbonate or propylene carbonate; an open-chain carbonate such as dimethyl carbonate, diethyl carbonate, or methyl ethyl carbonate; a lactone such as γ-butyrolactone; an open-chain ether such as 1,2-dimethoxyethane or dimethoxymethane; a cyclic ether such as tetrahydrofuran or dioxolane; acetonitrile; methylene chloride; and methyl acetate. These may be used singly, or in a combination of two or more kinds thereof. However, use of a mixed solvent of two or more compounds is more preferable. When a combination of two or more kinds of compound is used, it is preferable that at least a cyclic carbonate and an open-chain carbonate are included. When the cyclic carbonate is included, the content thereof is preferably from 10% by volume to 50% by volume, more preferably from 15% by volume to 45% by volume, and further preferably from 20% by volume to 40% by volume, with respect to the total amount of a non-aqueous solvent.

An electrolytic solution may further contain vinylene carbonate or fluoroethylene carbonate.

There is no particular restriction on an additive material, as long as it is an additive material for a non-aqueous electrolytic solution for a lithium-ion battery. Examples thereof include a heterocyclic compound containing nitrogen, sulfur, or nitrogen and sulfur, a cyclic carboxylic acid ester, a fluorine-containing cyclic carbonate, and other compounds having an unsaturated bond in a molecule thereof. In addition to the above additive materials, another additive material such as an overcharge prevention material, a material for forming an anode film, a cathode protection material, or a high input-output material may be used depending on a desired function.

Although there is no particular restriction on the content of an additive material in a non-aqueous electrolytic solution, the range thereof is as follows. When a plurality of additive materials are used, the following content means the content of each additive material. The lower limit of the content of an additive material with respect to a non-aqueous electrolytic solution is preferably 0.01% by mass or more, more preferably 0.1% by mass or more, and further preferably 0.2% by mass or more. The upper limit thereof with respect to a non-aqueous electrolytic solution is preferably 5% by mass or less, more preferably 3% by mass or less, and further preferably 2% by mass or less.

By using such other additive materials, a capacity retaining characteristic after storage at a high temperature, improvement of cycle performance, improvement of input-output property, or the like can be achieved.

A lithium-ion battery constituted as above may take various shapes, such as cylindrical, layer-built, or coin-shaped. For any shape, an electrode body is formed by interposing a separator between a cathode and an anode, and connecting current collector leads between a cathode current collector and a cathode terminal extending outward, and between an anode current collector and an anode terminal extending outward, and the electrode body is packed in a battery case hermetically together with a non-aqueous electrolytic solution, thereby completing a battery.

Figure 1:
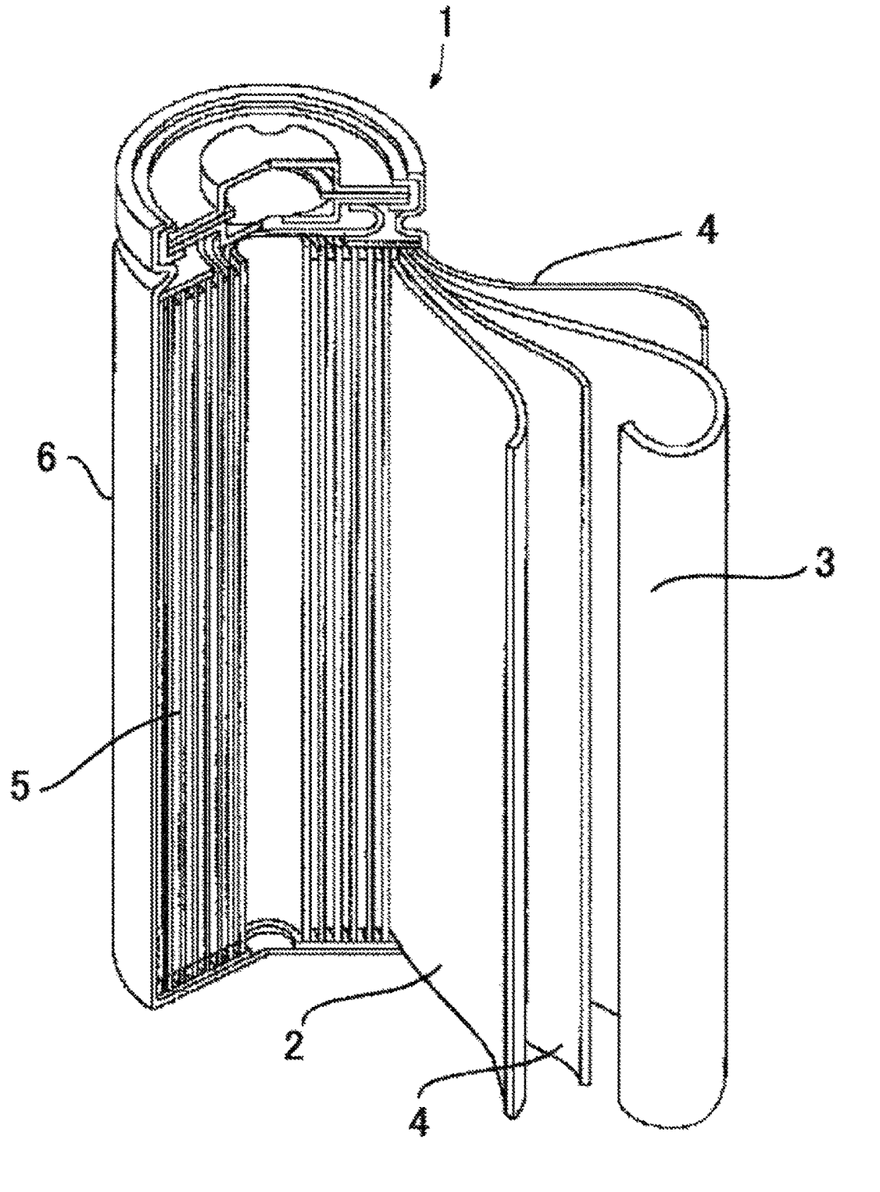
FIG. 1 is a cross-sectional view of a cylindrical lithium-ion secondary battery according to an embodiment to which the present invention is applicable.

Next, an embodiment in which the invention is applied to an 18650-type cylindrical lithium-ion secondary battery will be described by referring to a drawing.

A lithium-ion secondary battery 1 according to the embodiment shown in FIG. 1 has a battery container 6, which is made of a steel plated with nickel and is closed-bottom cylindrical. In the battery container 6, an electrode assembly 5, which is constituted with a cathode plate 2 and an anode plate 3 both in a strip form intercalated with a separator 4 and wound up spirally in cross-section, is accommodated. In the electrode assembly 5, a cathode plate 2 and an anode plate 3 are wound up spirally in cross-section intercalated with a separator 4 which is a polyethylene porous sheet. The separator 4 is configured, for example, such that the width thereof is 58 mm, and the thickness thereof is 30 µm. At the upper end surface of the electrode assembly 5, a cathode tab terminal, which is made of aluminum and in a ribbon form, and an end of which is fixed to the cathode plate 2, is extended outward. The other end of the cathode tab terminal is bonded by ultrasonic welding to the under surface of a disk-shaped battery cover, which is to be placed on the electrode assembly 5 and to function as a cathode external terminal. Meanwhile, at the lower end surface of the electrode assembly 5, an anode tab terminal, which is made of copper and in a ribbon form, and an end of which is fixed to the anode plate 3, is extended outward. The other end of the anode tab terminal is bonded by resistance welding to the inner bottom of the battery container 6. Therefore, the cathode tab terminal and the anode tab terminal are extended outward at the opposite end surfaces of the electrode assembly 5, respectively. In this regard, the whole outer circumference of the electrode assembly 5 is provided with an insulation coating (not illustrated). The battery cover is fixed by caulking at an upper part of the battery container 6 via a resin-made insulating gasket. Consequently, the inside of the lithium-ion secondary battery 1 is closed hermetically. In the battery container 6, a non-aqueous electrolytic solution is filled (not illustrated).

The end-of-charge voltage Vf of a lithium-ion battery system according to an embodiment is 3.6 V≤Vf≤4.0 V. When the Vf is 3.6 V or more, the input property is improved, and when the Vf is 4.0 V or less, an excessively high electric potential of a cathode can be suppressed, so that a degradation reaction with an electrolytic solution is suppressed and deterioration of a lifetime property can be suppressed. For a purpose of further favorable balance between an input property and a lifetime property of a lithium-ion battery, 3.7 V≤Vf≤3.9 V is preferable.

There is no particular restriction on a charge regulation means of a lithium-ion battery system according to an embodiment, as long as it is capable of regulating an end-of-charge voltage Vf within a range of 3.6 V≤Vf≤4.0 V. For example, a means which employs a control IC and has a regulation system, by which a battery is charged firstly at a constant current up to a pre-set upper limit voltage, and then charged keeping the voltage (constant current/constant voltage method), may be used.

In a lithium-ion battery system according to an embodiment, the capacity ratio of an anode to a cathode (anode capacity/cathode capacity) is preferably 0.7 or more and less than 1 from a viewpoint of input property. When the capacity ratio is 0.7 or more, the battery capacity tends to be improved and the volumetric energy density tends to be improved. When the capacity ratio is less than 1, a degradation reaction of an electrolytic solution due to a high electric potential of a cathode is suppressed, and the lifetime property of a lithium-ion battery tends to be favorable. The capacity ratio is more preferably from 0.8 to 0.95 from viewpoints of volumetric energy density and input property.

The terms "cathode capacity" and "anode capacity" respectively mean a maximum discharge capacity which can be utilized reversibly when an electrochemical cell is constructed using a counter electrode of metal lithium, and constant current-constant voltage charge and constant current discharge, or constant current charge and constant current discharge are carried out. A "cathode capacity" and an "anode capacity" are defined herein as a discharge capacity obtained when an evaluation is made using the electrochemical cell by conducting the above charging and discharging setting voltage ranges for charge and discharge to from 4.95 V to 3.5 V and from 2 V to 1 V, respectively, and current densities during constant current charge and constant current discharge at 0.1 mA/cm².

In the electrochemical cell, the direction in which a lithium-ion is inserted from a lithium-titanium complex oxide as an anode active material, is defined as charge, and the direction in which a lithium-ion is released therefrom is defined as discharge. Also, in the electrochemical cell, the direction in which a lithium-ion is released from a lithium manganese-nickel complex oxide as a cathode active material is defined as charge, and the direction in which a lithium-ion is inserted thereto is defined as discharge.

Although an embodiment of a lithium-ion battery according to the invention is described above, the embodiment is only an embodiment, and a lithium-ion battery according to the invention is not limited to the embodiment and may be conducted in various modes incorporating various modifications or improvements devised based on the knowledge of those skilled in the art.

EXAMPLES

The embodiment of the present invention will be described below in more detail based on Examples. However, the present invention is not restricted in any way by the following Examples.

(Production of Cathode)

To 88 parts by mass of lithium manganese-nickel complex oxide ($LiNi_{0.5}Mn_{1.5}O_4$) having an average particle diameter of 20 µm, 6 parts by mass of acetylene black (Denki Kagaku Kogyo K.K.) as an electroconductive material and 6 parts by mass of a copolymer, in which acrylic acid and a linear ether group were added to a polyacrylonitrile skeleton (Trade name: LSR7, Hitachi Chemical Co., Ltd.) as a binder were mixed, and an appropriate amount of N-methyl-2-pyrrolidone was added thereto, followed by kneading, thereby obtaining a cathode mixture slurry in a paste form.

The cathode mixture slurry was coated on both sides of a 20 μm-thick aluminum foil, which was a current collector for a cathode, substantially uniformly and homogeneously, such that the coating amount after drying became the cathode coating amount (g/m$^2$) shown in Table 1 or Table 2, thereby forming a cathode mixture layer. In this regard, a "cathode coating amount" shown in Table 1 or Table 2 is a coating amount of a cathode mixture layer coated on a single side of a current collector. Thereafter, a drying treatment was performed, and then pressing was conducted to compress each cathode mixture layer to a density of 2.3 g/cm$^3$, thereby obtaining a cathode in a sheet form.

In this regard, the average particle diameter of a lithium manganese-nickel complex oxide was determined as an arithmetic mean value of values of the major axis lengths (maximum particle diameters) of all lithium manganese-nickel complex oxide particles in a randomly-selected portion of 100 μm in length and 100 μm in width of a cathode, taken using a scanning electron micrograph.

(Production of Anode)

To 87 parts by mass of lithium-titanium complex oxide ($Li[Li_{1/3}Ti_{5/3}]O_4$) having an average particle diameter of 1 μm, 8 parts by mass of carbon black (Denki Kagaku Kogyo K.K.) as an electroconductive material and 5 parts by mass of poly(vinylidene fluoride) as a binder were mixed, and an appropriate amount of N-methyl-2-pyrrolidone was added thereto, followed by kneading, thereby obtaining an anode mixture slurry in a paste form.

The anode mixture slurry was coated on both sides of a 10 μm-thick copper foil, which was a current collector for an anode, substantially uniformly and homogeneously, such that the coating amount after drying became the anode coating amount (g/m$^2$) shown in Table 1 or Table 2, thereby forming an anode mixture layer. In this regard, an "anode coating amount" shown in Table 1 or Table 2 is a coating amount of an anode mixture layer coated on a single side of a current collector. Thereafter, a drying treatment was performed, and then pressing was conducted to compress each anode mixture layer to a density of 1.7 g/cm$^3$, thereby obtaining an anode in a sheet form.

In this regard, the average particle diameter of a lithium-titanium complex oxide was determined as an arithmetic mean value of values of the major axis lengths (maximum particle diameters) of all lithium-titanium complex oxide particles in a randomly-selected portion of 10 μm in length and 10 μm in width of an anode, taken using a scanning electron micrograph.

(Production of Lithium-ion Battery)

The cathode and the anode produced as above were cut respectively in predetermined sizes, and wound up together with a 30 μm-thick separator having a three-layered structure of polypropylene/polyethylene/polypropylene interposed between the cathode and the anode cut as above, thereby forming an electrode body in a reel form. In this case, the lengths of the cathode, the anode, and the separator in the winding direction were adjusted, such that the diameter of the electrode body became 17.15 mm.

The electrode body, to which collector leads were attached, was inserted in an 18650-type battery case, and a non-aqueous electrolytic solution was injected in the battery case. For the non-aqueous electrolytic solution, a solution prepared by dissolving $LiPF_6$ at a concentration of 1 M in a mixed solvent containing ethylene carbonate and dimethyl carbonate at a volume ratio of 3:7 was used. Finally, the battery case was closed hermetically, thereby completing a lithium-ion battery.

The cathode capacity and the anode capacity were determined under the conditions described in association with the embodiment above, and the capacity ratio of an anode to a cathode was determined by fixing the coating amount on a cathode and adjusting the coating amount on an anode. The results are shown in Table 1 and Table 2.

In this case, a reference capacity was calculated with respect to a lithium manganese-nickel complex oxide as a cathode active material based on 124.5 mAh/g per unit mass, and a reference capacity was calculated with respect to a lithium-titanium complex oxide as an anode active material based on 168.3 mAh/g per unit mass.

In this regard, the capacity per unit mass of the cathode active material and the anode active material was calculate as follows: the cathode and the anode in Experimental Example 10 were cut into a predetermined size (2 cm×2 cm), respectively; an electrochemical cell having the electrodes as well as a counter electrode made of metal lithium (in a size slightly larger than the cathode and the anode) and an electrolytic solution similarly to that in the 18650-type battery was constructed; and constant current charge (until 4.95 V for a cathode, and until 1 V for an anode) and constant-current discharge (until 3.5 V for a cathode, and until 2 V for an anode) at 25° C. with a current density of 0.1 mA/cm$^2$ were repeated twice, and the capacity per unit mass was calculated from the discharge capacity at the second cycle.

A cathode capacity and an anode capacity were calculated from the respective capacities per unit mass according to the following formulas.

Cathode capacity (mAh/m$^2$)=(124.5 mAh/g)×cathode coating amount (g/m$^2$)×content of cathode active material in cathode mixture (0.88 in Experimental Examples 1 to 35)

Anode capacity (mAh/m$^2$)=(168.3 mAh/g)×coating amount on anode (g/m$^2$)×content of anode active material in anode mixture (0.87 in Experimental Examples 1 to 35)

(Volumetric Energy Density)

The lithium-ion battery was charged by constant current charge at 25° C. with a current value of 0.2 C and an end-of-charge voltage of 3.4 V using a charge and discharge apparatus (BATTERY TEST UNIT, IEM), followed by constant-voltage charge with a charge voltage of 3.4 V until the current value reached 0.01 C. In this regard, the unit of current value C means [current (A)/battery capacity (Ah)]. After a pause of 15 minutes, constant current discharge (1st constant current discharge) was conducted with a current value of 0.2 C and an end-of-discharge voltage of 2.0 V.

Charge-and-discharge under the charging and discharging conditions above was repeated 3 times, followed by constant current charge with a current value of 0.2 C and an end-of-charge voltage of 3.6 V, and then constant voltage charge with a charge voltage of 3.6 V until the current value reached 0.01 C. After a pause of 15 minutes, constant current discharge (2nd constant current discharge) was conducted with a current value of 0.2 C and an end-of-discharge voltage of 2.0 V. A volumetric energy density was calculated by multiplying the discharge capacity at this time by 3.1 V, which was a voltage at a depth of discharge of 50% during the discharge, and dividing the product by the volume (L) of the 18650-type battery case. The results are shown in Table 1 and Table 2.

(Input Property)

Charge capacities (charge capacity at 0.5 C) in Examples 1 to 35 were each measured using the lithium-ion battery for which the volumetric energy density was measured, by conducting, after a pause of 15 minutes after the 2nd constant current discharge, constant current charge at 25° C. with a current value of 0.5 C and an end-of-charge voltage Vf shown in Table 1 and Table 2 corresponding to Experimental Examples 1 to 35 (from 3.4 V to 4.0 V), and then conducting constant voltage charge with an end-of-charge voltage Vf corresponding to Experimental Examples 1 to 35 (from 3.4 V to 4.0 V) until the current value reached 0.01 C.

After a pause of 15 minutes, constant current discharge was conducted at 25° C. with a current value of 0.5 C and an end voltage of 2 V. After 15 minutes, constant current charge was then conducted at 25° C. with a current value of 5 C and an end-of-charge voltage Vf corresponding to Experimental Examples 1 to 35 (from 3.4 to 4.0 V), and charge capacities (charge capacity at 5 C) in Examples 1 to 35 were measured. Then, an input property was calculated by the following formula. The results are shown in Table 1 and Table 2.

Input property (%)=(charge capacity at 5 C/charge capacity at 0.5 C)×100

(Experimental Examples 1 to 21)

The input property evaluation test is relevant to an input property in a case in which an end-of-charge voltage Vf (V) is $3.6 \leq Vf \leq 4.0$. The results are shown in Table 1.

(Experimental Examples 22 to 35)

The input property evaluation test is relevant to an input property in a case in which an end-of-charge voltage Vf (V) is 3.6>Vf. The results are shown in Table 2.

TABLE 1

| | Cathode coating amount (g/m$^2$) | Anode coating amount (g/m$^2$) | Capacity ratio | 1 C current (mA) | End-of-charge voltage Vf (V) | Input property (%) | Volumetric energy density (Wh/L) |
|---|---|---|---|---|---|---|---|
| Experimental Example 1 | 150 | 124 | 1.10 | 990 | 4.0 | 69 | 182 |
| Experimental Example 2 | 150 | 124 | 1.10 | 990 | 3.8 | 58 | 182 |
| Experimental Example 3 | 150 | 124 | 1.10 | 990 | 3.6 | 40 | 182 |
| Experimental Example 4 | 150 | 112 | 1.00 | 1030 | 4.0 | 73 | 190 |
| Experimental Example 5 | 150 | 112 | 1.00 | 1030 | 3.8 | 65 | 190 |
| Experimental Example 6 | 150 | 112 | 1.00 | 1030 | 3.6 | 48 | 190 |
| Experimental Example 7 | 150 | 107 | 0.95 | 1020 | 4.0 | 75 | 186 |
| Experimental Example 8 | 150 | 107 | 0.95 | 1020 | 3.8 | 67 | 186 |
| Experimental Example 9 | 150 | 107 | 0.95 | 1020 | 3.6 | 53 | 186 |
| Experimental Example 10 | 150 | 101 | 0.90 | 990 | 4.0 | 78 | 180 |
| Experimental Example 11 | 150 | 101 | 0.90 | 990 | 3.8 | 70 | 180 |
| Experimental Example 12 | 150 | 101 | 0.90 | 990 | 3.6 | 59 | 180 |
| Experimental Example 13 | 150 | 90 | 0.80 | 920 | 4.0 | 86 | 167 |
| Experimental Example 14 | 150 | 90 | 0.80 | 920 | 3.8 | 85 | 167 |
| Experimental Example 15 | 150 | 90 | 0.80 | 920 | 3.6 | 80 | 167 |
| Experimental Example 16 | 150 | 79 | 0.70 | 840 | 4.0 | 95 | 153 |
| Experimental Example 17 | 150 | 79 | 0.70 | 840 | 3.8 | 94 | 153 |
| Experimental Example 18 | 150 | 79 | 0.70 | 840 | 3.6 | 92 | 153 |
| Experimental Example 19 | 150 | 73 | 0.65 | 790 | 4.0 | 98 | 145 |
| Experimental Example 20 | 150 | 73 | 0.65 | 790 | 3.8 | 97 | 145 |
| Experimental Example 21 | 150 | 73 | 0.65 | 790 | 3.6 | 95 | 145 |

TABLE 2

| | Cathode coating amount (g/m$^2$) | Anode coating amount (g/m$^2$) | Capacity ratio | 1 C current (mA) | End-of-charge voltage Vf (V) | Input property (%) | Volumetric energy density (Wh/L) |
|---|---|---|---|---|---|---|---|
| Experimental Example 22 | 150 | 124 | 1.10 | 990 | 3.5 | 20 | 182 |

TABLE 2-continued

|  | Cathode coating amount (g/m²) | Anode coating amount (g/m²) | Capacity ratio | 1 C current (mA) | End-of-charge voltage Vf (V) | Input property (%) | Volumetric energy density (Wh/L) |
|---|---|---|---|---|---|---|---|
| Experimental Example 23 | 150 | 124 | 1.10 | 990 | 3.4 | 10 | 182 |
| Experimental Example 24 | 150 | 1!2 | 1.00 | 1030 | 3.5 | 30 | 190 |
| Experimental Example 25 | 150 | 112 | 1.00 | 1030 | 3.4 | 15 | 190 |
| Experimental Example 26 | 150 | 107 | 0.95 | 1020 | 3.5 | 35 | 186 |
| Experimental Example 27 | 150 | 107 | 0.95 | 1020 | 3.4 | 17 | 186 |
| Experimental Example 28 | 150 | 101 | 0.90 | 990 | 3.5 | 45 | 180 |
| Experimental Example 29 | 150 | 101 | 0.90 | 990 | 3.4 | 20 | 180 |
| Experimental Example 30 | 150 | 90 | 0.80 | 920 | 3.5 | 65 | 167 |
| Experimental Example 31 | 150 | 90 | 0.80 | 920 | 3.4 | 42 | 167 |
| Experimental Example 32 | 150 | 79 | 0.70 | 840 | 3.5 | 85 | 153 |
| Experimental Example 33 | 150 | 79 | 0.70 | 840 | 3.4 | 65 | 153 |
| Experimental Example 34 | 150 | 73 | 0.65 | 790 | 3.5 | 90 | 145 |
| Experimental Example 35 | 150 | 73 | 0.65 | 790 | 3.4 | 85 | 145 |

It becomes clear from the comparison between Experimental Examples 1 to 3 in Table 1 and Experimental Examples 22 to 23 in Table 2 that the input property improves as the end-of-charge voltage Vf increases, and that the input property improves by about 20% when the en-of-charge voltage Vf is set within a range of from 3.5 V to 3.6 V or higher.

Similarly, from the comparison between Experimental Examples 4 to 6 in Table 1 and Experimental Examples 24 to 25 in Table 2, between Experimental Examples 7 to 9 in Table 1 and Experimental Examples 26 to 27 in Table 2, between Experimental Examples 10 to 12 in Table 1 and Experimental Examples 28 to 29 in Table 2, between Experimental Examples 13 to 15 in Table 1 and Experimental Examples 30 to 31 in Table 2, between Experimental Examples 16 to 18 in Table 1 and Experimental Examples 32 to 33 in Table 2, and between Experimental Examples 19 to 21 in Table 1 and Experimental Examples 34 to 35 in Table 2, it becomes clear that the input property improves as the end-of-charge voltage Vf becomes higher.

Further, from the comparison among Experimental Examples 1, 4, 7, 10, 13, 16, and 19 in Table 1, it becomes clear that by reducing the capacity ratio, the input property improves. The above applies also to Experimental Examples 2, 5, 8, 11, 14, 17, and 20, Experimental Examples 3, 6, 9, 12, 15, 17, and 21, Experimental Examples 22, 24, 26, 28, 30, 32, and 34, as well as 23, 25, 27, 29, 31, 33, and 35.

When the capacity ratio is less than 0.70, the volumetric energy density tends to become lower.

From the above results, it has become clear that when an end-of-charge voltage Vf is made from 3.6 V to 4.0 V in the lithium-ion battery system, a battery being superior in input property and having an improved volumetric energy density is obtained.

In the embodiment, a preferable range of capacity ratio, where there is no risk of reduction of lifetime and a high volumetric energy density is available, is 0.7 or more and less than 1.0. Hereby, a lithium-ion battery which has a superior input property and a high volumetric energy density and whose lifetime reduction is suppressed, can be realized.

The entire contents of the disclosures by Japanese Patent Application Laid-Open (JP-A) No. 2014-010323, filed on Jan. 23, 2014 are incorporated herein by reference. All the literature, patent application, and technical standards cited herein are also herein incorporated to the same extent as provided for specifically and severally with respect to an individual literature, patent application, and technical standard to the effect that the same should be so incorporated by reference.

What is claimed is:

1. A lithium-ion battery system, comprising:
a lithium-ion battery comprising a cathode, an anode, and an electrolytic solution, the cathode comprising, as a binder, a copolymer in which acrylic acid and a linear ether group are added to a polyacrylonitrile skeleton, and a lithium manganese-nickel complex oxide as a cathode active material, and the anode comprising a lithium-titanium complex oxide as an anode active material; and
a charge regulation unit programmed to regulate an end-of-charge voltage Vf within a range of $3.7 \text{ V} \leq Vf \leq 4.0 \text{ V}$,
wherein a capacity ratio of the anode to the cathode (anode capacity / cathode capacity) is 0.7 or more and less than 1.

2. The lithium-ion battery system according to claim 1, wherein the end-of-charge voltage Vf is within a range of $3.7 \text{ V} \leq Vf \leq 3.9 \text{ V}$.

3. The lithium-ion battery system according to claim 1, wherein the electrolytic solution comprises a non-aqueous solvent and a lithium salt.

4. The lithium-ion battery system according to claim 3, wherein the non-aqueous solvent comprises at least one selected from the group consisting of a cyclic carbonate and an open-chain carbonate.

5. The lithium-ion battery system according to claim 4, wherein the open-chain carbonate comprises dimethyl carbonate.

6. The lithium-ion battery system according to claim 3, wherein a concentration of the lithium salt is from 0.5 mol/L to 1.5 mol/L with respect to the non-aqueous solvent.

7. The lithium-ion battery system according to claim 1, wherein the capacity ratio of the anode to the cathode (anode capacity/cathode capacity) is from 0.7 to 0.95.

8. The lithium-ion battery system according to claim 1, wherein the capacity ratio of the anode to the cathode (anode capacity/cathode capacity) is 0.8 or more and less than 1.

9. The lithium-ion battery system according to claim 1, wherein the capacity ratio of the anode to the cathode (anode capacity/cathode capacity) is from 0.8 to 0.95.

* * * * *